United States Patent
Lobovsky et al.

(10) Patent No.: US 9,895,843 B2
(45) Date of Patent: Feb. 20, 2018

(54) SYSTEMS AND METHODS FOR AN IMPROVED PEEL OPERATION DURING ADDITIVE FABRICATION

(71) Applicant: Formlabs, Inc., Somerville, MA (US)

(72) Inventors: Maxim Lobovsky, Cambridge, MA (US); Steven Thomas, Cambridge, MA (US); Ben FrantzDale, Harvard, MA (US)

(73) Assignee: Formlabs, Inc., Somerville, MA (US)

( * ) Notice: Subject to any disclaimer, the term of this patent is extended or adjusted under 35 U.S.C. 154(b) by 475 days.

(21) Appl. No.: 14/333,885

(22) Filed: Jul. 17, 2014

(65) Prior Publication Data
US 2016/0016361 A1    Jan. 21, 2016

(51) Int. Cl.
*B29C 67/00* (2017.01)
*B33Y 10/00* (2015.01)
*B33Y 30/00* (2015.01)
*B33Y 50/02* (2015.01)

(52) U.S. Cl.
CPC ...... *B29C 67/0088* (2013.01); *B29C 67/0066* (2013.01); *B29C 67/0085* (2013.01); *B33Y 10/00* (2014.12); *B33Y 30/00* (2014.12); *B33Y 50/02* (2014.12)

(58) Field of Classification Search
CPC ............ B29C 67/0088; B29C 67/0085; B29C 67/0066; B29C 64/386; B29C 64/20; B29C 64/135; B33Y 30/00; B33Y 50/02; B33Y 10/00
See application file for complete search history.

(56) References Cited

U.S. PATENT DOCUMENTS

| | | |
|---|---|---|
| 2014/0085620 A1 | 3/2014 | Lobovsky et al. |
| 2014/0170591 A1 | 6/2014 | El-Siblani |
| 2015/0231828 A1 | 8/2015 | El-Siblani et al. |
| 2016/0046080 A1 | 2/2016 | Thomas et al. |
| 2016/0052205 A1 | 2/2016 | FrantzDale |
| 2016/0129645 A1 | 5/2016 | Wighton et al. |

OTHER PUBLICATIONS https://forum.formlabs.com/t/tray-tilt-didnt-come-back-to-level/728 (Dec. 2013) (retrieved from the internet on Feb. 17, 2017).*

(Continued)

*Primary Examiner* — Robert J Grun
(74) *Attorney, Agent, or Firm* — Wolf, Greenfield & Sacks, P.C.

(57) ABSTRACT

According to some aspects, a method of additive fabrication wherein a plurality of layers of material are formed on a build platform is provided. The method may comprise forming a layer of material in contact with a container, and subsequent to the forming of the layer of material, rotating the container relative to the build platform and moving the build platform relative to the container, thereby creating an effective fulcrum about an axis, wherein the rotating of the container and moving of the build platform causes the layer of material to separate from the container. According to some embodiments, the container may be configured to rotate about a fixed axis. According to some embodiments, moving the build platform may comprise moving the build platform toward the container.

15 Claims, 10 Drawing Sheets

(56) References Cited

OTHER PUBLICATIONS

International Search Report and Written Opinion for PCT/US2015/040246 dated Oct. 16, 2015.
Fichter, A Stewart Platform-Based Manipulator: General Theory and Practical Construction, The International Journal of Robotics Research, Jun. 1986, vol. 5, No. 2, pp. 157-182.
Kohli et al., Manipulator Configurations Based on Rotary-Linear (R-L) Actuators and Their Direct and Inverse Kinematics, ASME Journal of Mechanisms, Transmissions, and Automation in Design, 1988, vol. 110, pp. 397-404.
Liu et al., Kinematic Analysis of a Stewart Platform Manipulator, IEEE Transactions on Industrial Electronics, Apr. 1993, vol. 40, No. 2, pp. 282-293.
Nanua et al., Direct Kinematic Solution of a Stewart Platform, IEEE Transactions on Robotics and Automation, Aug. 1990, vol. 6, No. 4, pp. 438-444.
Pierrot et al., DELTA: A Simple and Efficient Parallel Robot, Robotica, 1990, vol. 8, pp. 105-109.
Pierrot et al., Towards a Fully Parallel 6 DOF Robot for High-Speed Applications, 1991, Proc. of the IEEE International Conference on Robotics and Automation, pp. 1288-1293.
Stewart, A Platform with Six Degrees of Freedom, Proc. Institute of Mechanical Engineering, London, England, 1965, vol. 180, pp. 371-386.
Zhou et al., Digital material fabrication using mask-image-projection-based stereolithography. Rapid Prototyping J; (2013) vol. 19, No. 3: pp. 153-165.
International Preliminary Report on Patentability for International Application No. PCT/US2015/040246 dated Jan. 26, 2017.

\* cited by examiner

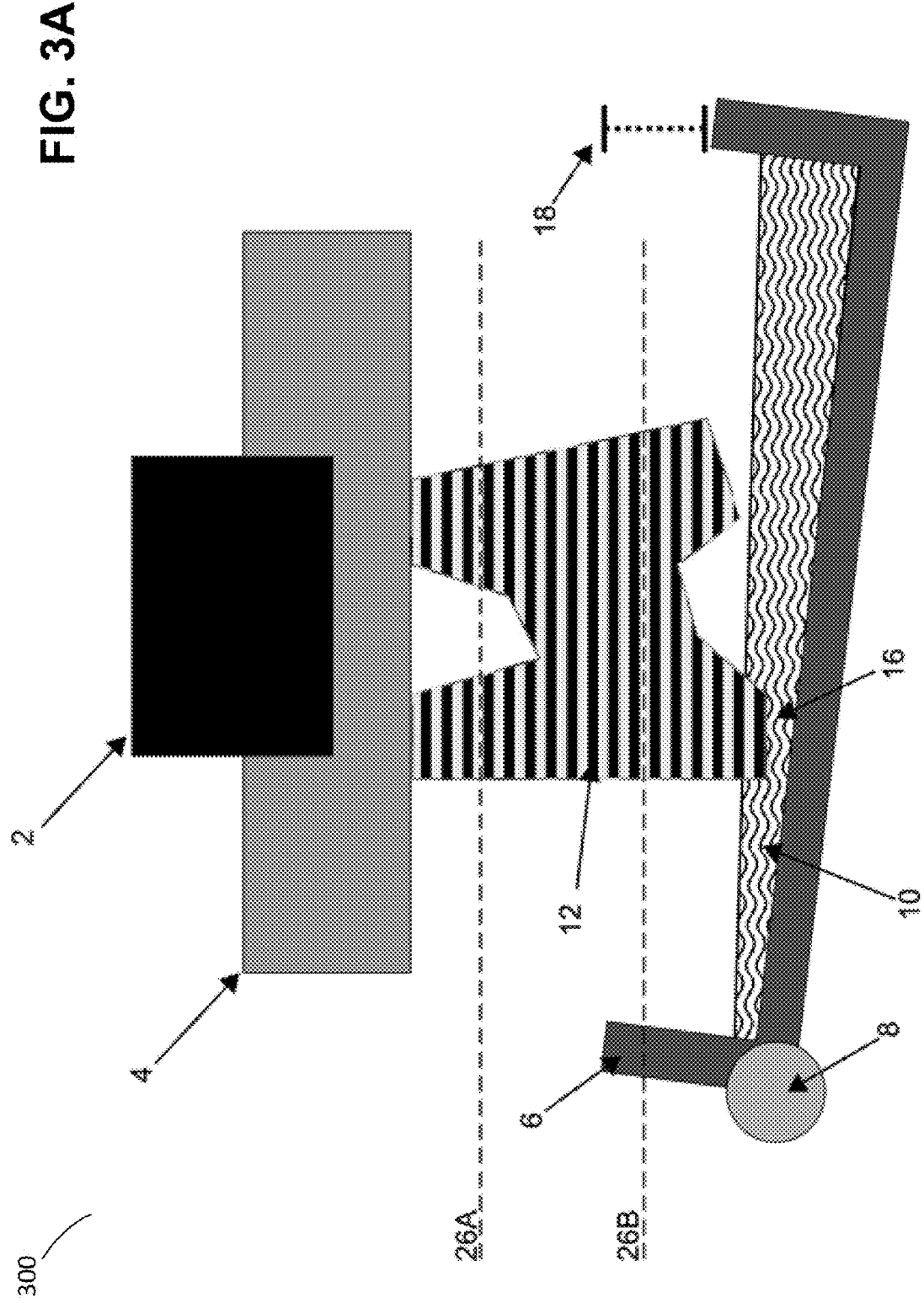

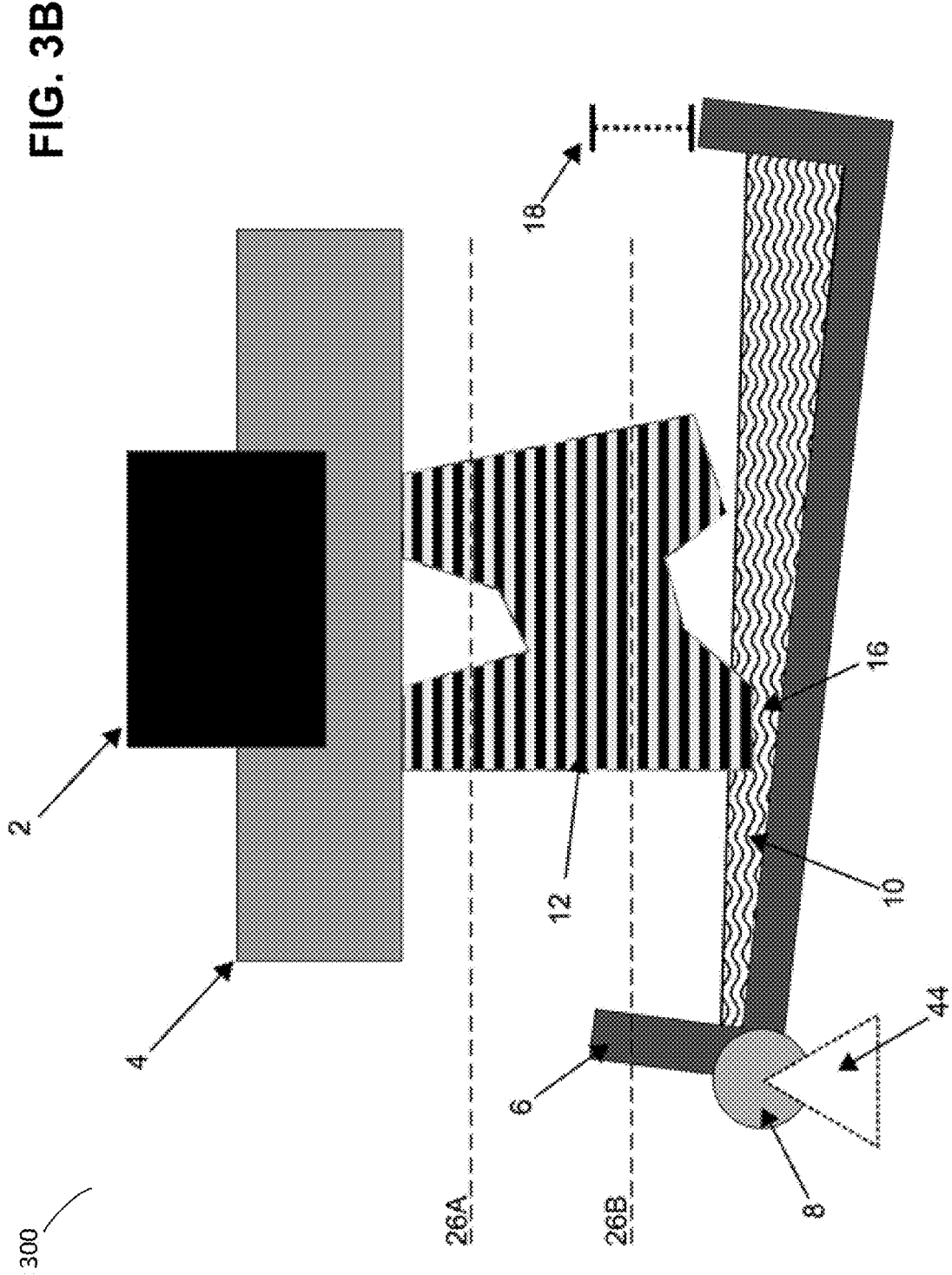

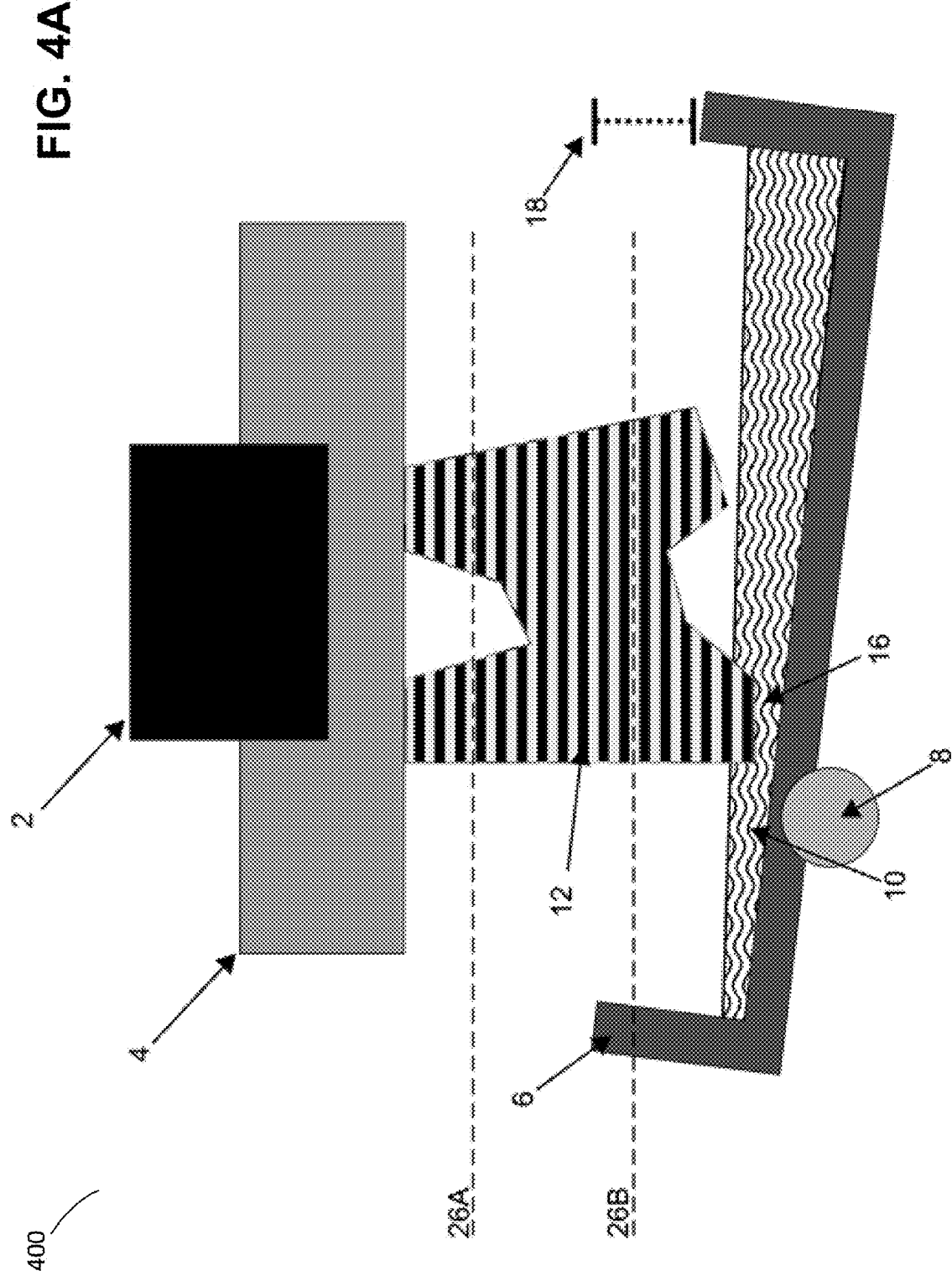

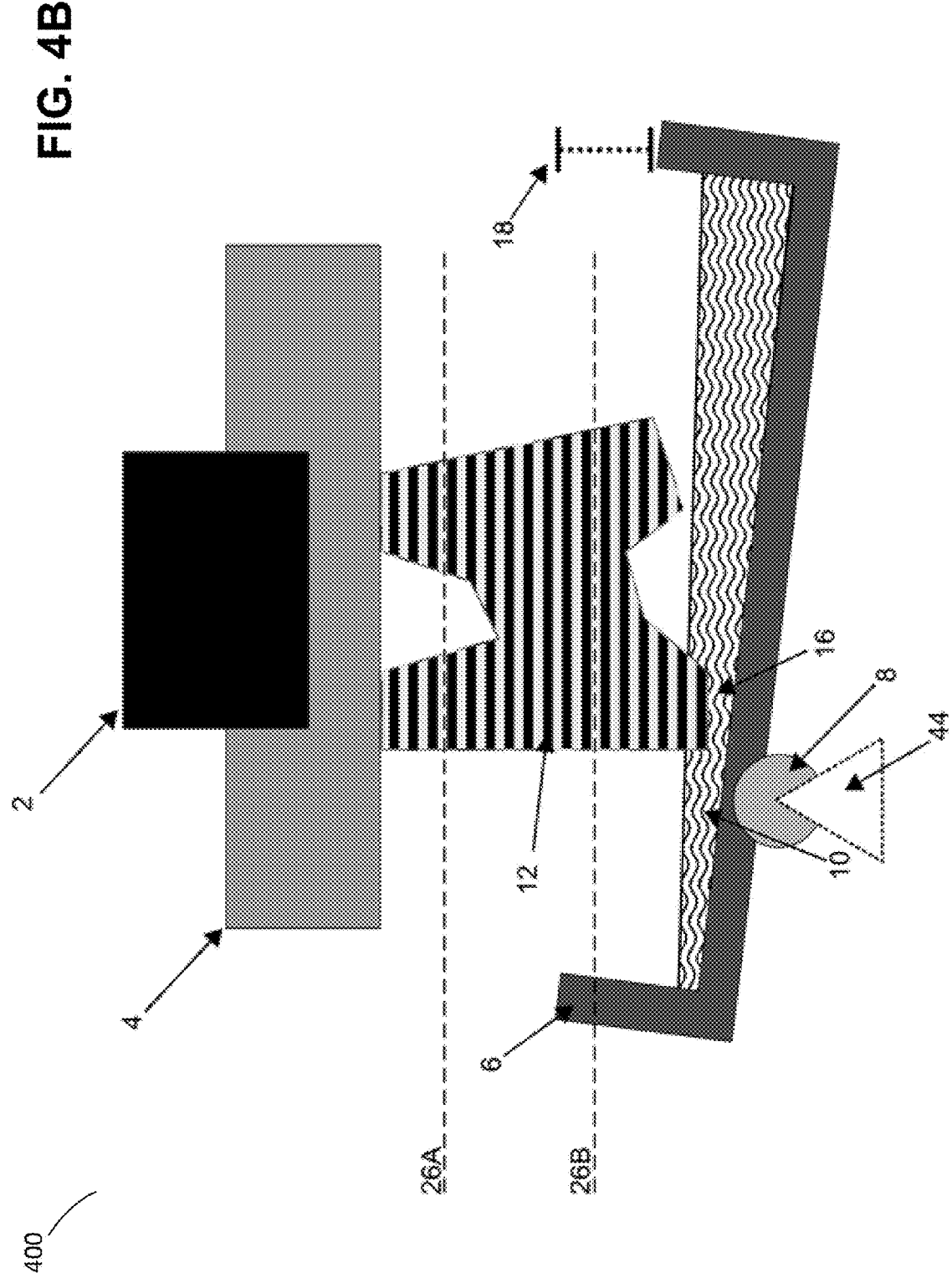

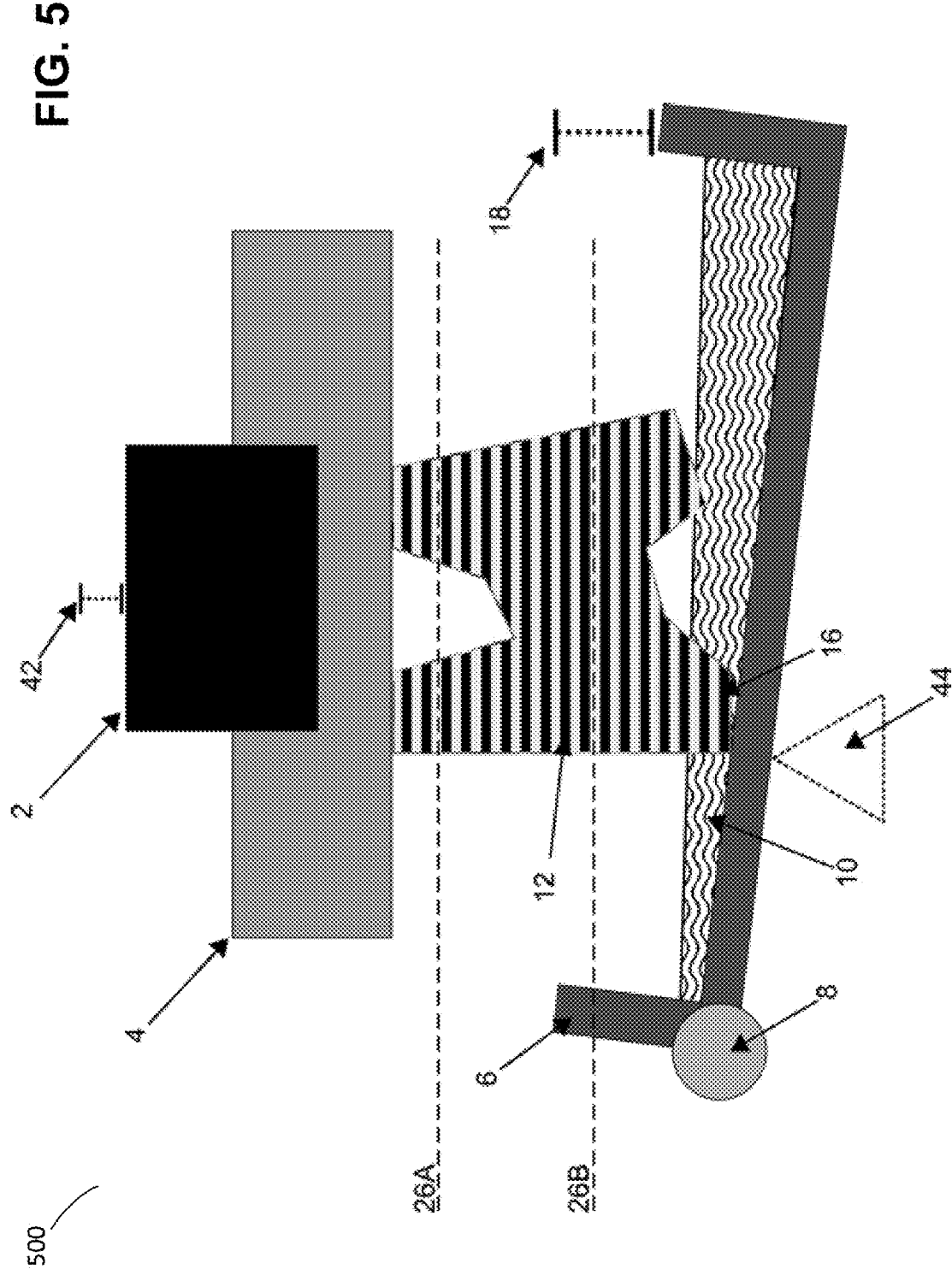

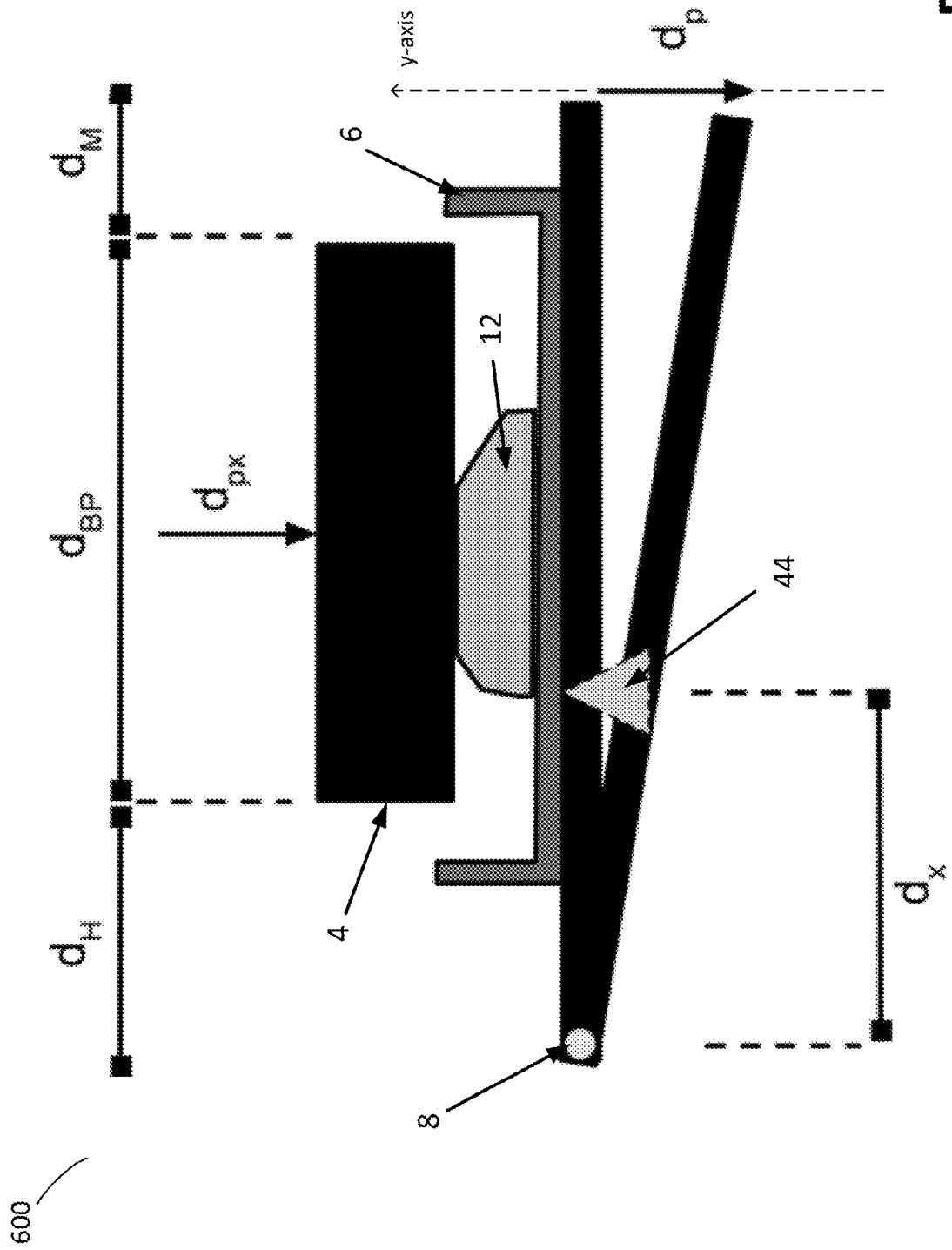

SYSTEMS AND METHODS FOR AN IMPROVED PEEL OPERATION DURING ADDITIVE FABRICATION

FIELD OF INVENTION

The present invention relates generally to systems and methods for separating a part from a surface during additive fabrication, e.g., 3-dimensional printing.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers and the bottom surface of the build platform.

SUMMARY

Systems and methods for separating a part from a surface during additive fabrication, are provided.

Some embodiments include a method of additive fabrication wherein a plurality of layers of material are formed on a build platform, comprising forming a layer of material in contact with a container; and subsequent to the forming of the layer of material, rotating the container relative to the build platform and moving the build platform relative to the container, thereby creating an effective fulcrum about an axis, wherein the rotating of the container and moving of the build platform causes the layer of material to separate from the container.

Some embodiments provide an additive fabrication apparatus configured to form a plurality of layers of material on a build platform, comprising a container, the build platform, one or more actuators, and at least one controller configured to rotate the container relative to the build platform via at least one of the one or more actuators, move the build platform relative to the container via at least one of the one or more actuators, and subsequent to formation of a layer of material in contact with the container, rotate the container and move the build platform, thereby creating an effective fulcrum about an axis, wherein the rotating of the container and moving of the build platform causes the layer of material to separate from the container.

Some embodiments provide at least one computer readable medium comprising instructions that, when executed, perform a method of additive fabrication wherein a plurality of layers of material are formed on a build platform, the method comprising forming a layer of material in contact with a container, and subsequent to the forming of the layer of material, rotating the container relative to the build platform and moving the build platform relative to the container, thereby creating an effective fulcrum about an axis, wherein the rotating of the container and moving of the build platform causes the layer of material to separate from the container.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3A illustrates a mechanical peel operation of a stereolithographic printer, according to some embodiments;

FIG. 3B illustrates formation of an effective fulcrum during a mechanical peel operation of a stereolithographic printer, according to some embodiments;

FIG. 4A illustrates formation of an effective fulcrum by use of a relocatable axis, according to some embodiments;

FIG. 4B illustrates formation of an effective fulcrum by a relocatable axis, according to some embodiments;

FIG. 5 illustrates formation of an effective fulcrum a distance from a fixed axis, according to some embodiments;

FIG. 6 provides a schematic view of dimensions of a stereolithographic printer, according to some embodiments;

DETAILED DESCRIPTION

Systems and methods for separating a part from a surface during additive fabrication are provided. As discussed above, in additive fabrication a plurality of layers of material may be formed on a build platform. In some cases, one or more of the layers may be formed so as to be in contact with a surface other than another layer or the build platform. For example, stereolithographic techniques may form a layer of resin so as to be in contact with an additional surface, such as a container in which liquid resin is located.

Figure 1:
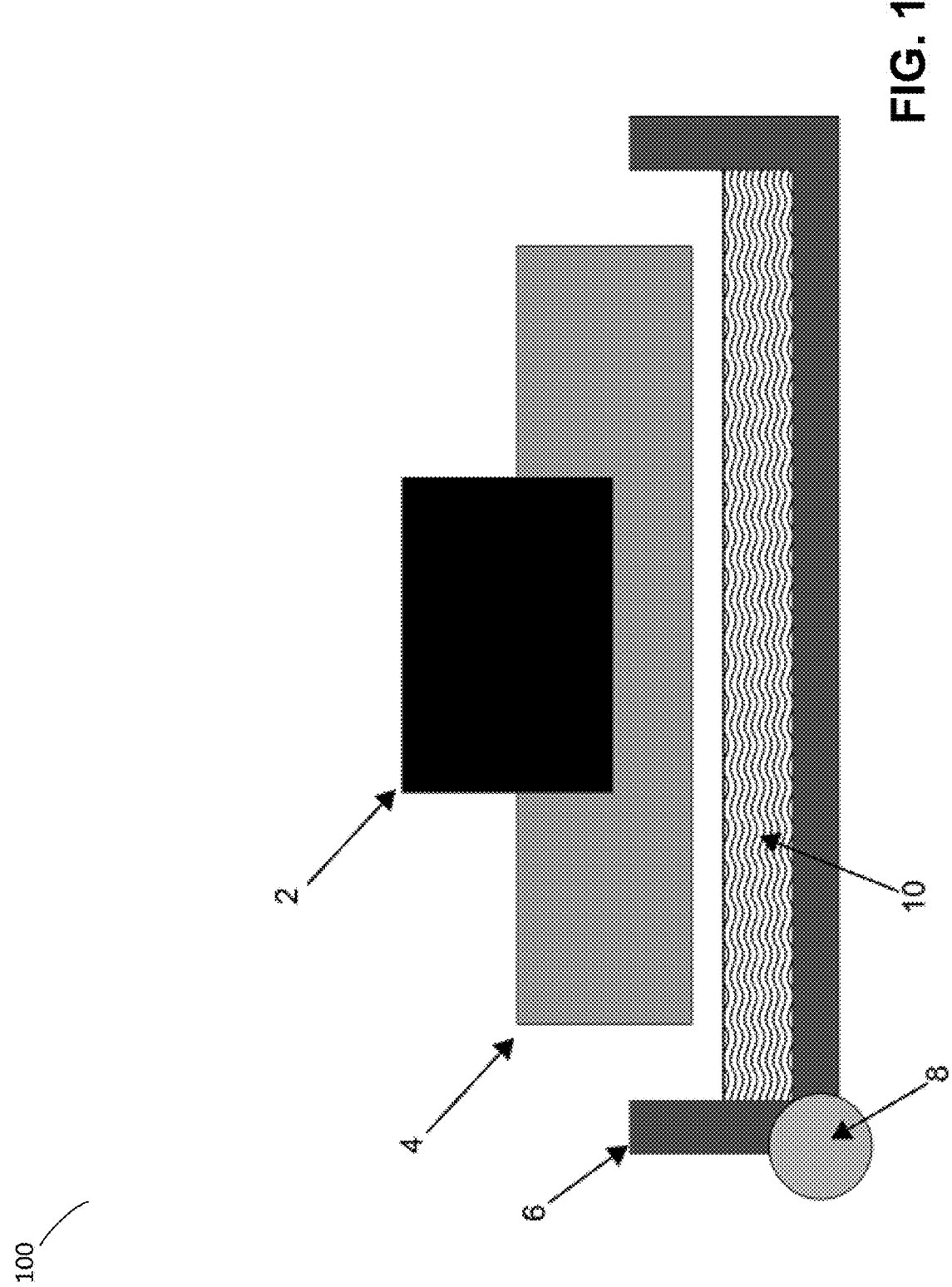
FIG. 1 provides a schematic view of a stereolithographic printer, according to some embodiments.
Figure 2:
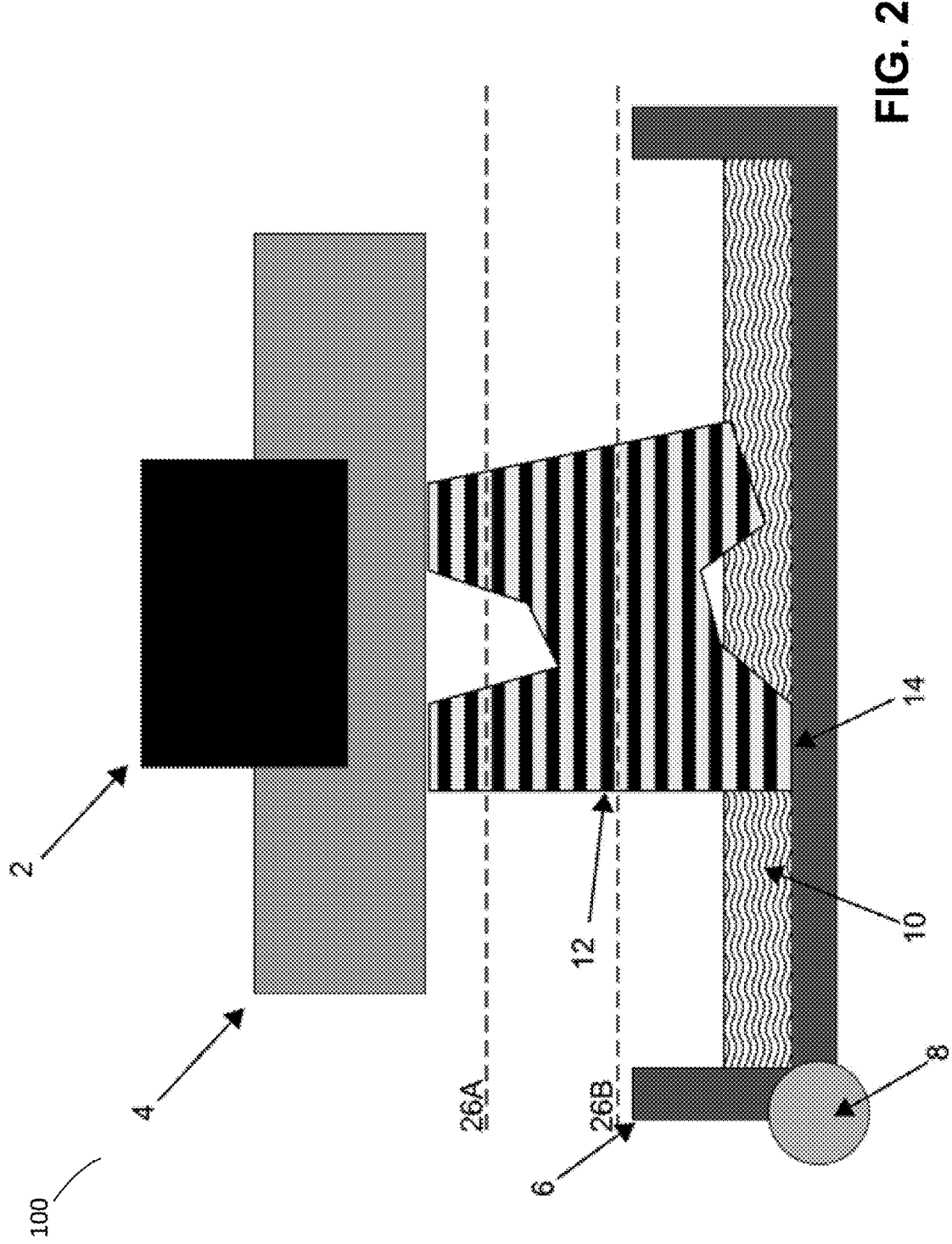
FIG. 2 provides a schematic view of a stereolithographic printer having formed a plurality of layer of a part, according to some embodiments.

To illustrate one exemplary additive fabrication technique in which a part is formed in contact with a surface other than another layer or the build platform, an inverse stereolithographic printer is depicted in FIGS. 1 and 2. Exemplary stereolithographic printer 100 forms a part in a downward facing direction such that layers of the part are formed in contact with a surface of a container into which the liquid resin is held in addition to a previously cured layer or the build platform. In the example of FIGS. 1 and 2, stereolithographic printer 100 comprises support structure 2, build platform 4, container 6, axis 8 and liquid resin 10. In the example of FIGS. 1-2, a downward facing build platform 4 opposes the floor of a container filled with a photopolymer resin 10. FIG. 1 represents a configuration of stereolithographic printer 100 prior to formation of any layers of a part on build platform 4.

As shown in FIG. 2, a part 12 may be formed layerwise, with the initial layer attached to the build platform 4. The container's floor is transparent to actinic radiation, which can then be targeted at portions of the thin layer of liquid photocurable resin resting on the floor of the container. Exposure to actinic radiation cures a thin layer of liquid resin 14, which causes it to harden. The layer 14 is at least partially in contact with both a previously formed layer and the surface of the container 6 when it is formed. The top side of the cured resin layer typically bonds to either the bottom surface of the build platform 4 or with the previously cured resin layer in addition to the transparent floor of the container 14. In order to form additional layers of the part subsequent to the formation of layer 14, any bonding that occurs between the transparent floor of the container and the layer must be broken. For example, one or more portions of the surface (or all of the surface) of layer 14 may adhere to the container such that the adhesion must be removed prior to formation of a subsequent layer.

Techniques for reducing the strength of this bond may include inhibiting the curing process or providing a highly smooth surface on the inside of the container. In many use cases, however, at least some force must be applied to remove the cured resin layer from the container floor. For example, a force may be applied by rotating the container to mechanically separate, or "peel," the container from the part 12. FIG. 3A depicts an exemplary stereolithographic printer that separates a part from the container by pivoting the container 6 about a fixed axis 8 on one side of the container, thereby displacing an end of the container distal to the fixed axis a distance 18 (which may be any suitable distance). Exemplary stereolithographic printer 300 also comprises support structure 2, build platform 4 and liquid resin 10. This "peeling" step involves a rotation of the container 6 away from the part 12 to separate layer 16 from the container, which may be followed by a rotation of the container back towards the part. In addition, the build platform 4 may move away from the container to create a space for a new layer of liquid resin to form between the part and the container. Subsequent to this motion, a new layer of liquid resin is available for exposure and addition to the part being formed. Each step of the aforementioned curing and peeling processes may continue until the part is fully created.

By progressively separating the part and the container base, such as in the peeling step described above, the total force necessary to separate the part and container may be controlled. If the parts were completely rigid, such a configuration would result in simultaneous separation across the face of the part, as rotation of the container about the fixed axis would result in an instantaneous velocity normal to the face of the part. However, if the part is at least somewhat elastic (which is typical in stereolithographic printing, for example), a separation using this method may not begin until a small deflection of the container has been performed. This may have an effect that a region of the part furthest from the fixed axis tends to separate from the container base prior to the separation of other regions of the part from the container. As a result, a progression separation may require less overall force to separate the part from the container compared with a peel that separates all regions of the part from the container at the same time. In addition, a progressive separation may mitigate certain suction forces caused by the void introduced by part separation by allowing resin, air, or other fluids to flow into the void.

The inventors have recognized and appreciated that multiple problems may arise due to the application of force during the above-described peeling process. For example, in some use cases a force may be applied to, and/or through, the part itself. A force applied to the part may, in some use cases, cause the part to separate partially or totally from the build platform, rather than the container, which may disrupt the formation process. In some use cases, a force applied to the part may cause deformation or mechanical failure in the part itself.

The inventors have further recognized and appreciated that the above-described problems with the peeling process may increase as a region of a part is located further from the axis of rotation. For example, increased mechanical forces that result at greater distances from the axis of rotation may cause a more rapid peel of the part from a surface, which may more readily cause the above-described problems. Accordingly, the inventors have recognized and appreciated that forces applied to a part being formed may be reduced, thereby reducing disruption to the formation process, by locating an effective fulcrum adjacent to, or close to, the part being formed. With such a fulcrum, the part is close to the axis of rotation, which thereby reduces the forces exerted on the part during a process of separating the part from a container compared with an axis located further from the part.

In some embodiments, an effective fulcrum may be mechanically formed such that separation of a part from a container is achieved by moving the container alone. A container mechanically configured to rotate about any axis along a length of the container may be able to reduce forces applied to a part during separation by choosing a suitable axis location, such as a location close to, or adjacent to, a region of the part. For example, an axis may be identified as adjacent to an edge of a layer of a part just formed that is in contact with the container. By rotating the container about this axis, the just-formed layer may be separated from the container while reducing forces exerted on the part during separation.

In some embodiments, an effective fulcrum may be formed such that separation of a part from a container is achieved by moving both the container and build platform. In some use cases, it may be mechanically difficult and/or expensive to configure the container to rotate about any chosen axis along its length, and an equivalent fulcrum may instead be formed by simultaneously moving the container and build platform such that the net result is the container rotating relative to the part about the chosen axis. Since the relative motion of the container and part are equivalent to the above-discussed case where only the container moves, this approach of forming an effective fulcrum may similarly reduce forces exerted on the part during separation. In such an approach, the container may move about a fixed axis, such as at an end of the container, and the movement of the build platform may be coordinated with the rotation of the container about the fixed axis so as to form the effective fulcrum at a chosen location.

In embodiments in which the container and the build platform both move, the container may rotate about the fixed axis in either direction such that the motion of the build platform is coordinated to create the effective fulcrum. For example, the container may rotate in a counterclockwise direction while the build platform moves away from the container, or the container may rotate in a clockwise direction while the build platform moves towards the container. Any of these motions may be performed any number of times during formation of a single part, as it may be beneficial to form an effective fulcrum at different locations at different times during the formation.

Irrespective of whether the container and/or build platform move to create the effective fulcrum, the container and/or build platform may move at any speed and in any direction or directions such that the effective fulcrum is created. For example, in embodiments in which the build platform moves, it may move in any direction including directions towards the container and directions away from the container (which need not be perpendicular to the floor of the container. The container and/or build platform may move at different velocities for various stages of the separation process. For example, the container may move at a first velocity during an initial portion of the separation of the part from the container, and at a second velocity, different from the first velocity, during a subsequent portion of the separation.

Subsequent to the part being separated from the container, the container and/or build platform may move in preparation for a subsequent layer of the part being formed. This movement may be a reverse motion of the motion used to separate the part from the container, though may alternatively be a different motion. In embodiments in which the container and part both move, any motion of the container and part subsequent to the separation of the container and part may, or may not, be coordinated in the manner described above for creating an effective fulcrum. For example, it may be beneficial to move the container and/or part to a new position in preparation for forming a new layer of the part more rapidly than the motion used to separation the container from the part, e.g., to reduce the total time needed to form the part.

In some embodiments, motion of the container and/or the build platform is controlled by one or more actuators. The one or more actuators may be controlled by any number of suitable controllers, including one or more general purpose processors, Application Specific Integrated Circuits (ASICs), Field-Programmable Gate Arrays (FPGAs) and/or combinations thereof.

In some embodiments, a position of an effective fulcrum may be determined, at least in part, based on the geometry of a part being formed. This may include the geometry of the part at a stage during fabrication (e.g., may include the geometry of the partially fabricated object) and/or may include a portion of this geometry. For example, a geometry of the most recently formed layer of the part may be used, at least in part, to determine a position of an effective fulcrum to separate the layer from a container. As another example, the previously formed N (where N>1) layers of the part may be used, at least in part, to determine a position of an effective fulcrum to separate the most recently formed layer from the container.

Following below are more detailed descriptions of various concepts related to, and embodiments of, systems and methods for separating a part from a surface during additive fabrication. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Although the embodiments herein are primarily disclosed with respect to the Form 1 3D Printer sold by Formlabs, Inc., the Assignee of the present application, and with respect to stereolithography, those having ordinary skill in the art will appreciate that the invention may be applicable to other systems. In some embodiments, structures fabricated via one or more additive fabrication techniques as described herein may be formed from, or may comprise, a plurality of layers. For example, layer-based additive fabrication techniques may fabricate an object by formed a series of layers, which may be detectable through observation of the object, and such layers may be any size, including any thickness between 10 microns and 500 microns. In some use cases, a layer-based additive fabrication technique may fabricate an object that includes layers of different thickness.

Although particular systems and methods for separating a part from a surface during additive fabrication have been described and shown herein, it is envisioned that the functionality of the various methods, systems, apparatus, objects, and computer readable media disclosed herein may be applied to any now known or hereafter devised additive fabrication technique wherein it is desired to separate a part from a surface during fabrication.

As discussed above, the inventors have recognized and appreciated that multiple problems may arise due to the application of force during the peeling process described above and depicted in FIG. 3A. In particular, as shown in FIG. 3B, the illustrative example provided in FIG. 3A typically forms a Class 2 lever, wherein an effective fulcrum 44 is located at the fixed axis 8. Because of this configuration, the mechanical advantage of the lever tends to increase the magnitude of the peel forces applied to areas of the part 12 further away from the fixed axis 8. This increase in the applied force may be undesirable, as it may lead to increased part 12 distortion and failure.

FIG. 4A depicts an inverse stereolithographic process that forms an effective fulcrum a distance from an end of a container, according to some embodiments. In the example of FIG. 4A, an axis 8 can be mechanically relocated along the based of container 6. Exemplary inverse stereolithographic printer 400 comprises support structure 2, build platform 4 and liquid resin 10. The container 6 may be rotated about axis 8 by any suitable amount thereby displacing an end of the container a distance 18 (which may be any suitable distance) and separating a layer 16 of part 12 from the container. For example, the axis may be relocated based on the location of the part 12 on build platform 4. As discussed above, selecting an effective fulcrum to be closer to a part being formed by moving the axis of rotation, as depicted in FIG. 4B, may improve part quality and device performance.

According to some embodiments, the fixed axis 8 is not movable, which may for example avoid additional complexity and cost of such a movable feature. Instead, as depicted in exemplary FIG. 5, one embodiment of the present invention creates an effective fulcrum 44 at a different location to the fixed axis 8 by simultaneously moving the build platform a distance 42.

As illustrated by the example of FIG. 5, an effective fulcrum 44 may be created in the reference frame of the part being formed by a coordinated movement depicted by displacement 42 of the build platform 4 while the container 6 is pivoted down thereby displacing the container a distance 18 (which may be any suitable distance) about the fixed axis 8. Exemplary stereolithographic printer 500 shown in FIG. 5 comprises support structure 2, build platform 4 and liquid resin 10. While the actual fulcrum of the motion remains at the fixed axis 8, the coordinated downwards motion depicted by displacement 42 of the build platform 4 results in a force profile that approximates a fulcrum 44 located further in from the fixed axis 8.

In some embodiments, coordinated motion of the build platform and container may be achieved via software controlling the motions of the build platform 4 and container 6 to locate the effective fulcrum 44 at a range of locations (e.g., via one or more actuators coupled to the build platform and container). For example, such motion may be orchestrated with a number of physical systems, including by use of open-loop systems such as stepper motors or closed-loop systems such as servomotors.

According to some embodiments, motion of a container and/or a build platform may be based, at least in part, on one or more dimensions of the system. FIG. 6 provides an illustrative example of a system, depicting several such dimensions, any number of which may be used to determine a motion (e.g., velocity, acceleration, timing of motion, etc.) of a container and/or build platform.

In the example of FIG. 6, the distance between a fixed axis 8 and the closer edge of the build platform 4 is represented as $d_H$, the width of the build platform 4 in a direction perpendicular to the fixed axis 8 and parallel to the plane of the build platform is represented as $d_{BP}$, and the distance between the edge of the build platform opposite the fixed axis 8 and the point at which downwards force is applied to the lever is represented as $d_M$.

It will be appreciated that, while some dimensions such as those discussed above may be substantially constant for a given system, other relevant dimensions may depend on the geometry of the desired part 12, and accordingly may, in some use cases, vary layer by layer during the operation of the machine. For example, the distance between the fixed axis 8 and the effective fulcrum 44 (whose position may be chosen based at least in part on one or more of the dimensions shown in FIG. 6, for example) represented by $d_x$ may be adjusted during the operation of the print process (e.g., based on the geometry of the part In the example of FIG. 6, a distance the container 6 is moved down represented as $d_p$, and the velocity at which the container 6 is moved down, represented by $v_p$, may also change during the operation of the printing process. For example, during a first peel operation the container may move a first distance down at a first velocity, and during a second peel operation, the container may move a second distance, different from the first distance, down at a second velocity, different from the first velocity.

As discussed above, a location of an effective fulcrum may be chosen to reduce forces applied to a part 12 during separation of the part from container 6. In the example of FIG. 6, the location of the effective fulcrum 44 is characterized by a distance $d_x$ from a fixed axis 8. In some embodiments, $d_x$ may be set to be $d_H$, thus moving the effective fulcrum 44 to the edge of the build platform.

In some embodiments, $d_x$ may be calculated based on the geometry of one or more layers of part 12. For example, $d_x$ may be calculated based on the minimum, maximum, or average of $d_x$ that was used for one or more of the previously-formed layers. As one non-limiting example, $d_x$ may be calculated based on a distance from the fixed axis 8 and the edge of the most recently formed layer closest to the fixed axis along a line perpendicular to the fixed axis 8 and parallel to the plane of the build platform.

In some embodiments, $d_x$ is set to be close to, but not adjacent to, a part being formed. This may, for example, avoid damage to the part due to excess compression during the peel operation caused by the container pushing against and/or pulling at the part. As a non-limiting example, $d_x$ may be calculated based on a distance from the fixed axis 8 and the closest edge of the layer to the fixed axis to be formed N layers after the current layer L so as to avoid damage to the part due to excess compression during the peel operation. A sufficient value of N can be calculated using the following equation, where $d_{part}$ represents the greatest width of the part formed so far across the build platform, normal to the fixed axis 8, and $t_{layer}$ represents the layer height used in the formation process:

$$N = \frac{d_{rel}}{t_{layer}}$$

where $$d_{rel} = \tan(\theta_{max}) \cdot d_{part}$$

$$\theta_{max} = \operatorname{atan}\left(\frac{d_P}{d_H + d_{BP} + d_M}\right)$$

In some embodiments, a value of $d_x$ may be determined by calculating the convex hull of the union of the portion of the part 12 already formed and the build platform 4 in the plane normal to the fixed axis 8. Using said convex hull, $d_x$ is set such that $d_x$ is a given offset distance closer to the fixed axis 8 than the closest vertex of said convex hull. This may, for example, provide an effective fulcrum that is close, but not adjacent to, to the part being formed while ensuring it is in a location in which an effective fulcrum can be created by motion of the build platform and container.

The effective fulcrum 44 may be created at a distance $d_x$ from the fixed axis by lowering the build platform 4 towards the container 6 at any suitable speed or speeds and over any suitable distance. In some embodiments, the movement of the build platform 4 and container 6 may be physically or logically coupled to provide a synchronized motion of the build platform and container. For example, each may be controlled by one or more open-loop stepper motor systems configured to move such that the resulting combined motion of the container and build platform combined approximates the motion of a true fixed axis 8 located at the effective fulcrum 44 point. In the example of FIG. 6, the effective fulcrum 44 may be located at $d_x$ by pivoting the container 6 down a distance of $d_p$ at a velocity of $v_p$ while simultaneously moving the build platform 4 down a distance of distance of $d_{px}$ at a velocity of $v_{px}$ wherein $d_{px}$ and $v_{px}$ are governed by the following equations:

$$h = \frac{d_x}{d_H + d_{BP} + d_M}$$

$$d_{px} = d_p \cdot h$$

$$v_{px} = v_p \cdot h$$

In some embodiments, the movement of the build platform 4 may be expressed in terms of a ratio between the motion of the container 6 and the build platform 4. For example, in an open-loop stepper motor configuration, the build platform 4 may be lowered by individual steps for every K steps that the container is rotated. In some use cases, K may be chosen based on the parameters of the step motors and geometry of the machine such that it closely approximates h, as calculated above.

In some embodiments, upon the completion of the peeling process described above, the build platform 4 and part 12 may extend below the position of the container 6 when horizontal. The build platform 4 may then be raised to prepare for forming a subsequent layer. For example, the build platform may be raised at least a distance $d_{px}$ in a vertical direction in order to return the build platform 4 to the location it would otherwise have but for the movements performed during the peel operation. Following such a return move, the container 6 may, additionally or alternatively, be returned to a horizontal orientation. In some embodiments, the return motions of the build platform 4 and container 6 may be coordinated such that both move at a reciprocal direction and speed from the motions described above during the peel process. In such cases, however, it may be beneficial for the build platform to be further raised a preset distance to avoid reattaching the most recently formed layer of the part 12 to the bottom of the container 6.

Although aspects of the present invention described herein may describe an effective fulcrum being formed between the fixed axis 8 and part 12 such that the container rotates in a downward direction (e.g., clockwise in the example of FIG. 6), other embodiments of the same invention may form the effective fulcrum 44 such that the direction of the peeling operation is reversed. For example, $d_p$ may be negative, representing a tilt of the container 6 up, rather than down, above a horizontal starting plane. If $d_x$ is then set so as to be closer to the edge of the container 6 furthest from the fixed axis 8, the peeling separation of the part 12 from the container 6 may begin along the edge of the part 12 closest to the fixed axis 8, rather than furthest from it as is the case in certain examples described above. Thus the effective fulcrum 44 may be moved such that the container appears to pivot from the side opposite from the fixed axis 8 without requiring mechanical changes or duplication of the fixed axis 8. Such a configuration may advantageously allow for additional options for part removal and the distribution of wear on the container 6 lower surface.

Figure 7:
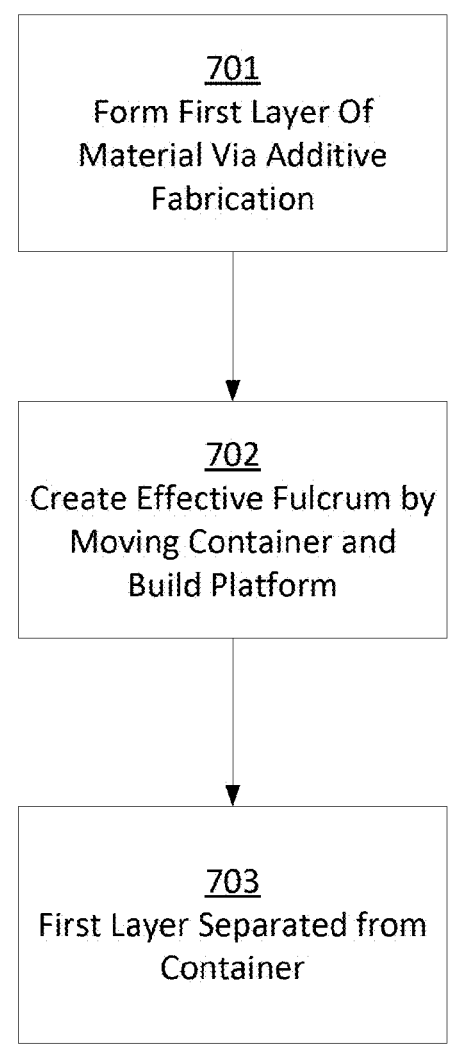
FIG. 7 illustrates a flow chart of a process suitable for separating a part from a surface during additive fabrication, according to some embodiments.

FIG. 7 illustrates a flow chart of a process suitable for separating a part from a surface during additive fabrication, according to some embodiments. Method 700 may be performed by any suitable additive fabrication apparatus, including but not limited to a stereolithographic printer as described above, for example in the exemplary embodiment shown in FIG. 5.

In act 701, a first layer of material is formed via additive fabrication. The first layer of material may be formed at any time during additive fabrication of a part. For example, the first layer may be the sole layer formed (e.g., on a build platform), or may be the most recently formed layer and may be in contact with one or more previously formed layers.

In act 702, an effective fulcrum is created by moving the container and the build platform. As discussed above in relation to FIG. 5, by coordinating the movement of the container about a fixed axis with movement of the build platform, an effective fulcrum may be created a distance from the fixed axis. In act 702, an effective fulcrum may be formed in this manner, which causes at least the first layer of material to separate from the contained via the peel operation described above in act 703.

Figure 8:
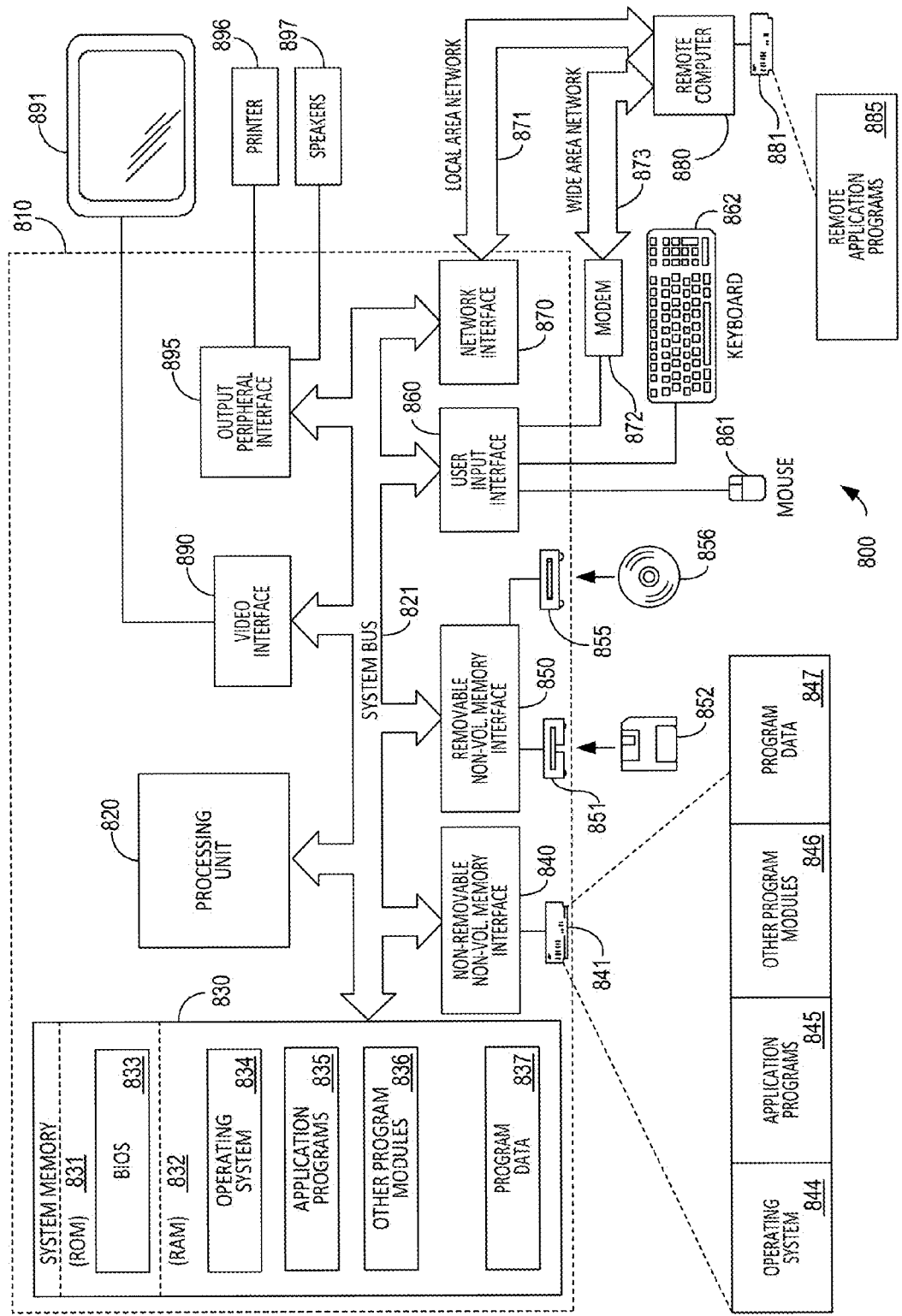
FIG. 8 illustrates an example of a computing system environment on which aspects of the invention may be implemented.

FIG. 8 illustrates an example of a suitable computing system environment 800 on which aspects of the invention may be implemented. For example, the computing system environment 800 may be used to determine the supportedness of one or more regions of an object, to generate a support structure for an object, to generate support tips for a support structure, to indicate the supportedness of one or more regions of an object via a graphical user interface, to interface with one or more devices to effect additive fabrication of an object and/or a support structure, or any combinations thereof. Such a computing environment may represent a home computer, a tablet, a mobile device, a server and/or any another computing device.

The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

Aspects of the invention are operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing aspects of the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through an non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through a output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

The various methods or processes outlined herein may be implemented in any suitable hardware. Additionally, the various methods or processes outlined herein may be implemented in a combination of hardware and of software executable on one or more processors that employ any one of a variety of operating systems or platforms. For example, the various methods or processes may utilize software to instruct a processor to determine the supportedness of one or more regions of an object to be fabricated via one or more additive fabrication techniques; and/or to generate a support structure, with or without support tips, for an object to be fabricated via one or more additive fabrication techniques. Example of such approaches are described above. However, any suitable combination of hardware and software may be employed to realize any of the embodiments discussed herein.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Various inventive concepts may be embodied as one or more methods, of which examples have been provided. For example, methods of separating a part from a surface during additive fabrication have been provided herein. The acts performed as part of any method described herein may be ordered in any suitable way. Accordingly, embodiments may be constructed in which acts are performed in an order different than illustrated, which may include performing some acts simultaneously, even though these acts may have been shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art.

For example, techniques of separating a portion of a part formed through additive fabrication from a surface were described. These techniques may be applied in other contexts. For example, any additive fabrication process in which a portion of a part being formed becomes in any way attached to a surface other than another portion of the part or a build platform may utilize techniques as described herein. Such modifications and improvements are intended to be within the spirit and scope of the invention. Accordingly, the foregoing description is by way of example only, and is not intended as limiting.

What is claimed is:

1. A method of additive fabrication wherein a plurality of layers of material are formed on a build platform, comprising:
   forming a layer of material in contact with a container; and
   subsequent to the forming of the layer of material, rotating the container relative to the build platform about a first axis and simultaneously moving the build platform relative to the container, thereby creating an effective fulcrum about a second axis, parallel to and different from the first axis, about which the container rotates relative to the layer of material,
   wherein the rotating of the container and moving of the build platform causes the layer of material to separate from the container.

2. The method of claim 1, wherein rotating the container comprises rotating the container about an end of the container.

3. The method of claim 1, wherein the container is fixed to a structure at the first axis.

4. The method of claim 1, wherein moving the build platform relative to the container comprises moving the build platform toward the container.

5. The method of claim 1, further comprising identifying the second axis a first distance from an end of the container.

6. The method of claim 1, wherein the layer of material is formed such that it at least partially adheres to the container.

7. The method of claim 1, wherein the layer of material is formed in contact with a previously formed layer.

8. The method of claim 1, further comprising determining a position of the second axis based at least in part on a size and/or position of the layer of material.

9. The method of claim 8, wherein the second axis is determined based at least in part on a distance from an end of the container to an edge of the layer of material.

10. An additive fabrication apparatus configured to form a plurality of layers of material on a build platform, comprising:
   a container;
   the build platform;
   one or more actuators; and
   at least one controller configured to:

rotate the container relative to the build platform via at least one of the one or more actuators;

move the build platform relative to the container via at least one of the one or more actuators; and subsequent to formation of a layer of material in contact with the container, rotate the container about a first axis and simultaneously move the build platform, thereby creating an effective fulcrum about a second axis, parallel to and different from the first axis, about which the container rotates relative to the layer of material, wherein the rotating of the container and moving of the build platform causes the layer of material to separate from the container.

11. The apparatus of claim 10, wherein the at least one controller is configured to rotate the container about an end of the container.

12. The apparatus of claim 10, wherein moving the build platform comprises moving the build platform toward the container.

13. The apparatus of claim 10, wherein the at least one controller is further configured to identify the second axis a first distance from an end of the container.

14. The apparatus of claim 10, wherein the second axis is determined by the at least one controller based at least in part on a size and/or position of the layer of material.

15. The apparatus of claim 14, wherein the second axis is determined by the at least one controller based at least in part on a distance from an end of the container to an edge of the layer of material.

* * * * *